United States Patent [19]

Kleinholz

[11] Patent Number: 4,599,984
[45] Date of Patent: Jul. 15, 1986

[54] VAPOR FUEL SUPPLY SYSTEMS FOR INTERNAL COMBUSTION ENGINES

[76] Inventor: Edward O. Kleinholz, 1518 E. Cross St., Tulare, Calif. 93274

[21] Appl. No.: 516,557

[22] Filed: Jul. 25, 1983

[51] Int. Cl.$^4$ ............................................. F02M 31/00
[52] U.S. Cl. ...................................... 123/557; 123/558
[58] Field of Search .............. 123/522, 549, 523, 556, 123/557, 558; 261/144, 145, 69 R; 48/189.2

[56] References Cited

U.S. PATENT DOCUMENTS

| | | | |
|---|---|---|---|
| 2,285,905 | 6/1942 | Cunningham | 123/557 |
| 2,744,387 | 5/1956 | Reed | 123/557 |
| 2,775,981 | 1/1957 | Zonker | 123/457 |
| 4,092,963 | 6/1978 | Krooman | 123/557 |
| 4,413,607 | 11/1983 | Batchelor | 123/525 |
| 4,423,716 | 1/1984 | Glass | 123/557 |
| 4,434,774 | 3/1984 | Horiuchi | 123/557 |

Primary Examiner—Ronald H. Lazarus
Attorney, Agent, or Firm—Edward R. Weber

[57] ABSTRACT

A fuel supply system for internal combustion engines whereby a liquid hydrocarbon fuel is supplied to an enclosed pressure chamber, and wherein the chamber the liquid fuel is heated to within temperature limit of 95% plus or minus 5% of that said fuel's refined distillation end point. At that temperature high vapor pressure exists within the enclosed compression chamber. The resulting vapor is conveyed to the carburetor venturi system and combustion chamber in true vaporous state by means through a cooperating system of primary and secondary pressure reducing regulators. Attached onto the interior wall of the compression chamber is a liquid fuel dispensing pump, which maintains a constant fuel level within that chamber. Energy to operate the pump is derived from surrounding pressure within the compression chamber.

13 Claims, 17 Drawing Figures

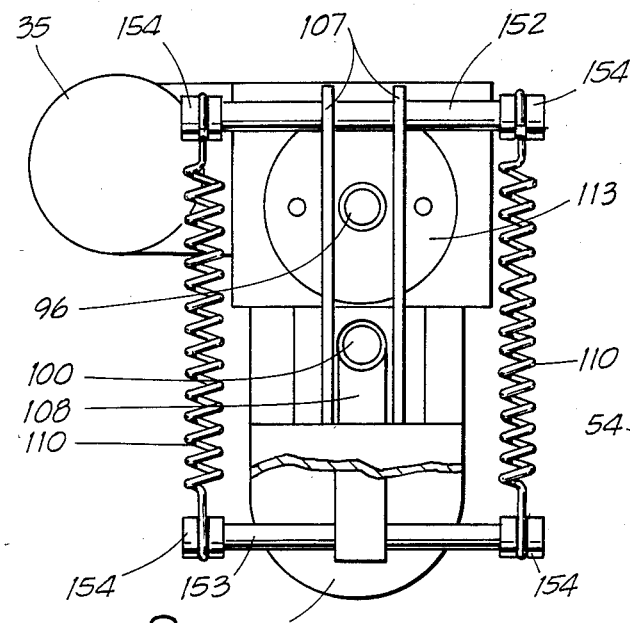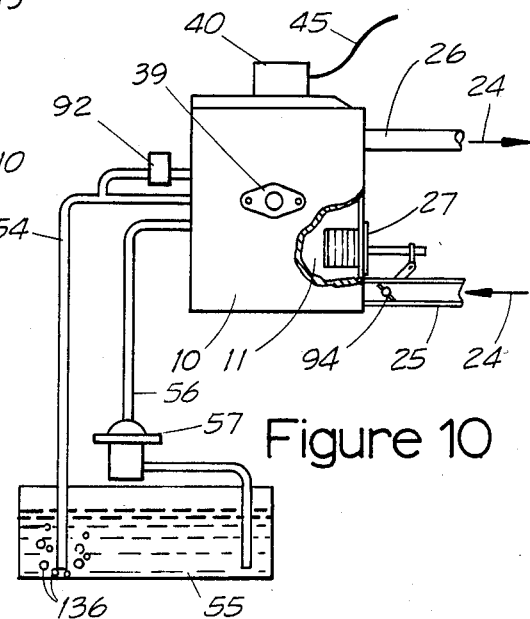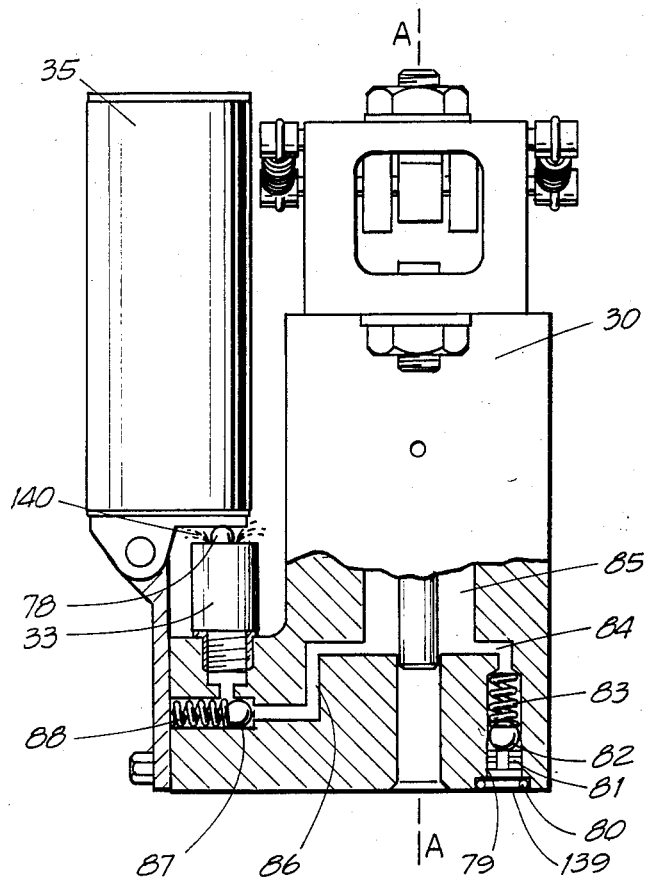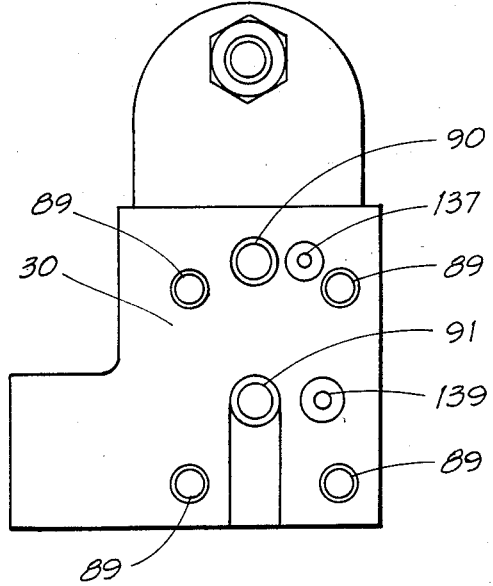
Figure 8
Figure 10
Figure 7
Figure 9

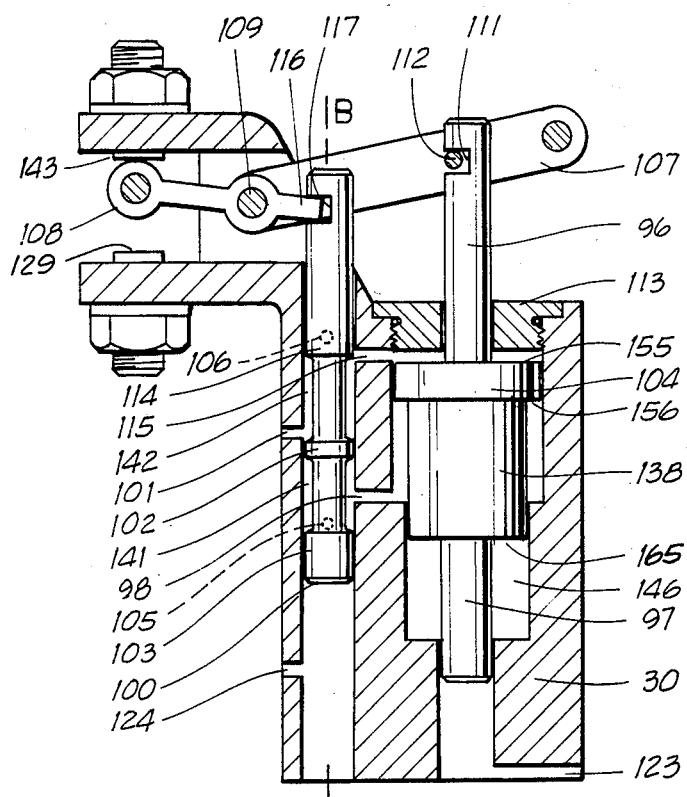
Figure 13
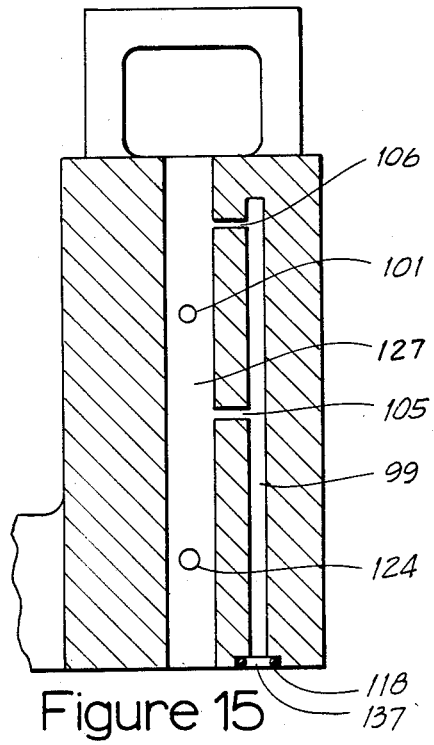
Figure 15
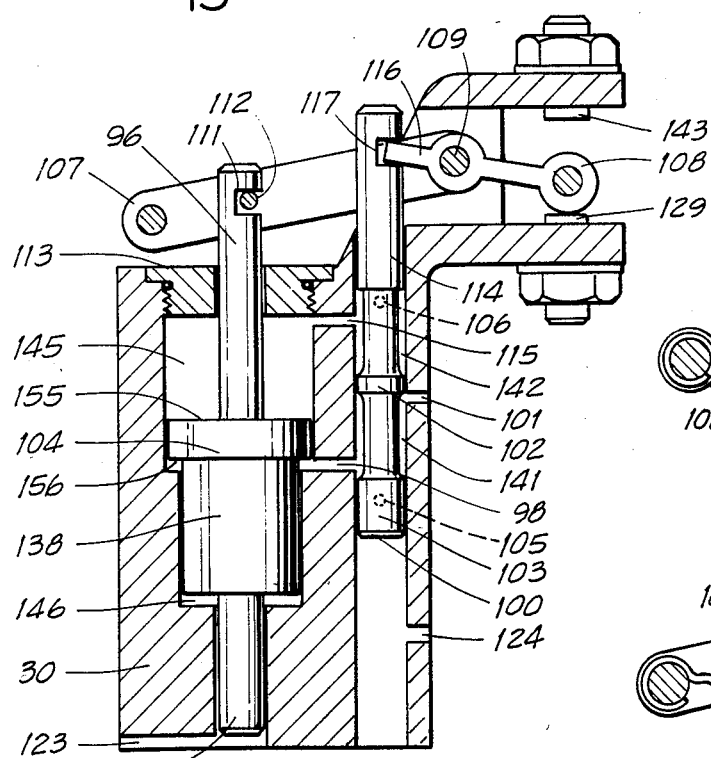
Figure 11
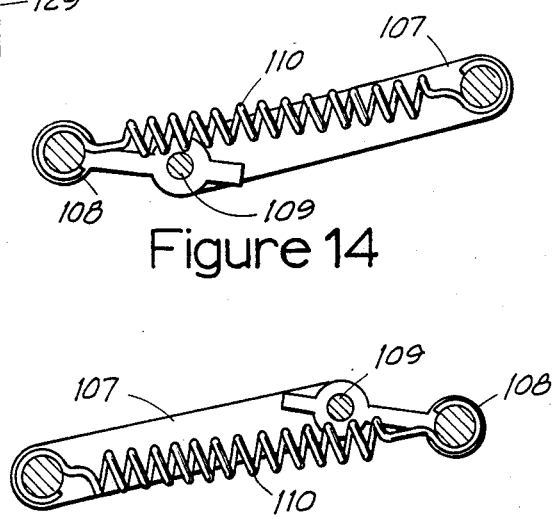
Figure 14
Figure 12

VAPOR FUEL SUPPLY SYSTEMS FOR INTERNAL COMBUSTION ENGINES

BACKGROUND OF THE INVENTION

This invention relates to fuel systems and vaporizing devices therein for internal combustion engines, and more specifically fuel gas generators.

Fuel systems for internal combustion engines have generally used carburetors in which liquid fuel is sprayed into a stream of air and divided into a series of fine droplets approaching vaporization and conveyed to the point of combustion. Only those molecules at the surface of the gasoline droplets are in position to react with another species and incomplete combustion results because of the very short time allowed being insufficient for more than a little vaporizaton of the fuel to occur. The prior art engines therefore exhaust large quantities of unburned hydrocarbons, carbon monoxide and nitrogen.

The only way to burn all of the fuel where it is needed and desired is to mix molecules of air completely and evenly with the molecules of the fuel. This is done by turning the liquid into a true gas or vapor.

This invention vaporizes the liquid fuel at high temperature and pressure so as to completely gasify over that fuel's distillation temperature range, consequently, practically complete combustion occurs within the engine combustion chamber due to the spacing of the molecules resulting from high temperature and pressure.

OBJECT OF INVENTION

The primary object of this invention is to provide a new and improved system whereby the efficiency of internal combustion engines is improved.

Another object of the present invention is to utilize a unique fuel economy system for internal combustion engines which provides a practical operative and readily realizable means for dramatically decreasing fuel consumption.

A further object of the present invention is to provide an improved fuel economy system whereby pollutant emissions from the engine exhaust are substantially reduced.

SUMMARY

A hot fuel vapor generator wherein a liquid fuel is heated to refining end point temperature and relative vapor pressure, and thus generated is caused to flow through a system of regulating controls to the combustion chamber.

A novelty of this invention is of incorporation of an internally mounted liquid fuel pump, which receives motivating force from its surrounding vapor pressure.

BRIEF DESCRIPTION OF DRAWINGS

FIG. 7 is a side and upright elevation of fuel pump in generator of FIG. 1, illustrating pathway of liquid fuel, from point of intake to discharge into compression chamber.

FIG. 8 is a top view of FIG. 7.

FIG. 9 is a bottom view of FIG. 7.

FIG. 10 is a diagramatic illustration of cooperating systems pertaining to operation of generator of FIG. 1.

FIG. 11 is a left-hand sectional view of FIG. 7 taken along line A—A illustrating positions of reciprocal compound piston and reciprocal valve member at beginning of liquid fuel intake cycle.

FIG. 12 illustrates positions of tension springs and toggle bars relative to common center pivot of FIG. 11.

FIG. 13 is a right-hand sectional view of FIG. 7 taken along line A—A illustrating positions of reciprocal compound piston and reciprocal valve member at beginning of liquid fuel discharge cycle.

FIG. 14 illustrates positions of tension springs and toggle bars to common center pivot of FIG. 13.

FIG. 15 is a cross-sectional view of FIG. 13 taken along line B—B.

DESCRIPTION OF PREFERRED EMBODIMENT

Figure 1:
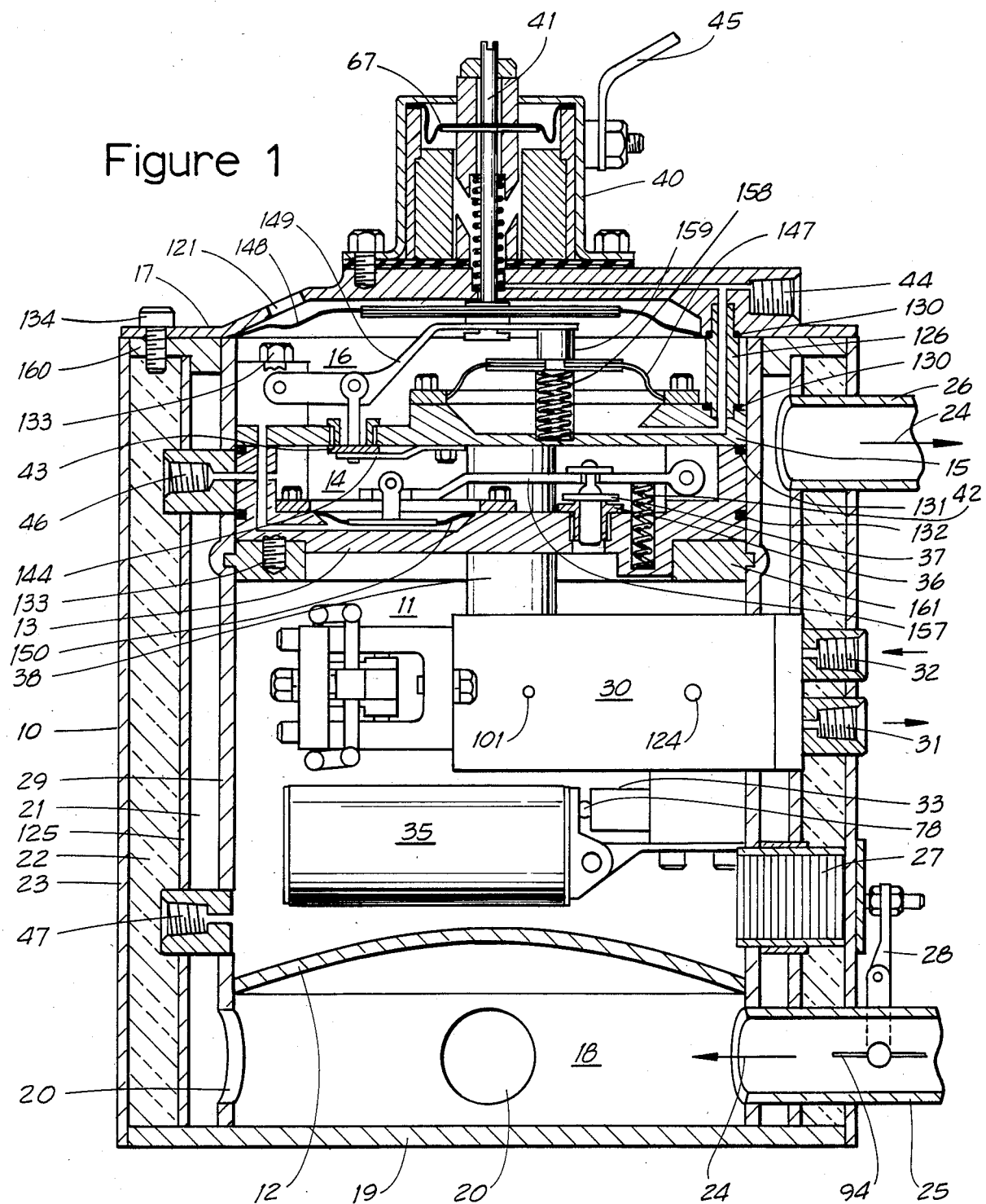
FIG. 1 is a cross-sectional elevation of the vapor gas generator.

Referring to FIG. 1 in particular, it is noted that the hot fuel generator is comprised of a multi-chambered vessel in form of a cylindrical hollow body generally indicated by the numeral 10. The main portion of which has a boiler compression chamber 11 therein, lower curved plate 12 forming the heating bottom of said chamber, the upper opposite closure being that by plate 13, which also is the lower barrier for primary pressure reduction chamber 14, which has an opposing plate 15 for its upper barrier, and above chamber 14, confined by said barrier plate 15 and flexible diaphram 148 is a secondary pressure reducing chamber 16. Also noted below curved plate 12 is a fourth chamber 18 enclosed by base plate 19, having communication means through interaccess holes 20 in chamber wall 29 into a fifth chamber 21; also for chamber 21 having communication with air outlet tube extension 26; and chamber 18 having communication with air inlet tube extension 25; and chamber 21 being encased by a thermal insulation blanket 22 and exterior body shell 23.

Approximately at midpoint of chamber 11, is a liquid fuel dispensing pump 30 attached upon wall 29, having as part of its assembly, a needle valve assembly 33 and a fluid level control float 35.

Mounted on top of chamber closure plate 17 is a control device 40 in form of a combination solenoid-vacuum diaphragm and armature-plunger rod assembly, designated by numerals 67 and 41 respectively; the purpose of which is to initiate and maintain vapor flow at idle operation of engine.

Mounted fluid tight upon walls 29 and 125 is a pressure reacting device 27, the purpose of which is a control means from within chamber 11, to limit and maintain a predetermined pressure within boiler compression chamber 11.

Noted near periphery of cover plate 17, is bolt 134 which is one of a circular group for attachment of said cover onto the generator main body member 160; and inside and under cover 17 is a second arrangement of bolts 133 clamping plates 13 and 15 onto chamber inside shoulder ring 161.

Designated by numeral 126 is a vacuum conduit, fluid sealed from chamber 16 by "O" rings 130, connecting underside of diaphragm 147 to female threaded adaptor 44 of cover plate 17. Also of note are "O" ring seals 131 and 132 isolating chamber 14 from chambers 11 and 16. Female adaptor 46 is placed into chamber 14 for attaching a pressure relief valve providing safety means in case of excessive pressure generated in that chamber. Assorted pipe or similar access fittings 47 can be conveniently placed leading into chamber 11 for attaching temperature, pressure and other devices as required.

Referring now to the pressure reducing system, as illustrated in chambers 14 and 16, this system is well known and relates generally to fuel devices and relates more particularly to devices for regulating the pressure of fluid derived from a high pressure source, such as for example, butane, propane and the like. The system is fully illustrated and explained in U.S. Pat. No. 2,775,981 issued Jan. 1, 1957 and is used extensively upon automobiles and industrial internal combustion engines wherein pressures of supply sources vary from 150 to 250 pounds per square inch and the system regulates vapor fuel flow according to engine demand and RPM.

The abovementioned hydrocarbon fuels have relatively high vapor pressure at normal atmospheric temperatures and pressure, and are stored in vessels of high pressure capability. This invention reverses those conditions. The liquid fuel in use has little or no vapor pressure at atmospheric temperature and pressure. In order to vaporize completely, it must be heated in an enclosed chamber to that fuel's distillation end point temperature, whereupon the resulting vapor pressure is similar to that of liquid butane and propane in storage containers. Therefore the same method of pressure reducing system can be applied for both types of fuels.

With conventional regulator bodies, for example those used for propane systems, the regulator body is isolated from the engine proper, and most generally attached somewhere onto a fender wall or other convenient place available. This invention includes the pressure regulating system within the generator body, for purpose of simplicity and continuity of temperature throughout the system. Further reference to the abovementioned pressure reducing regulators in this specification is not necessary except for mention of components thereof and functions pertaining thereto.

Figure 2:
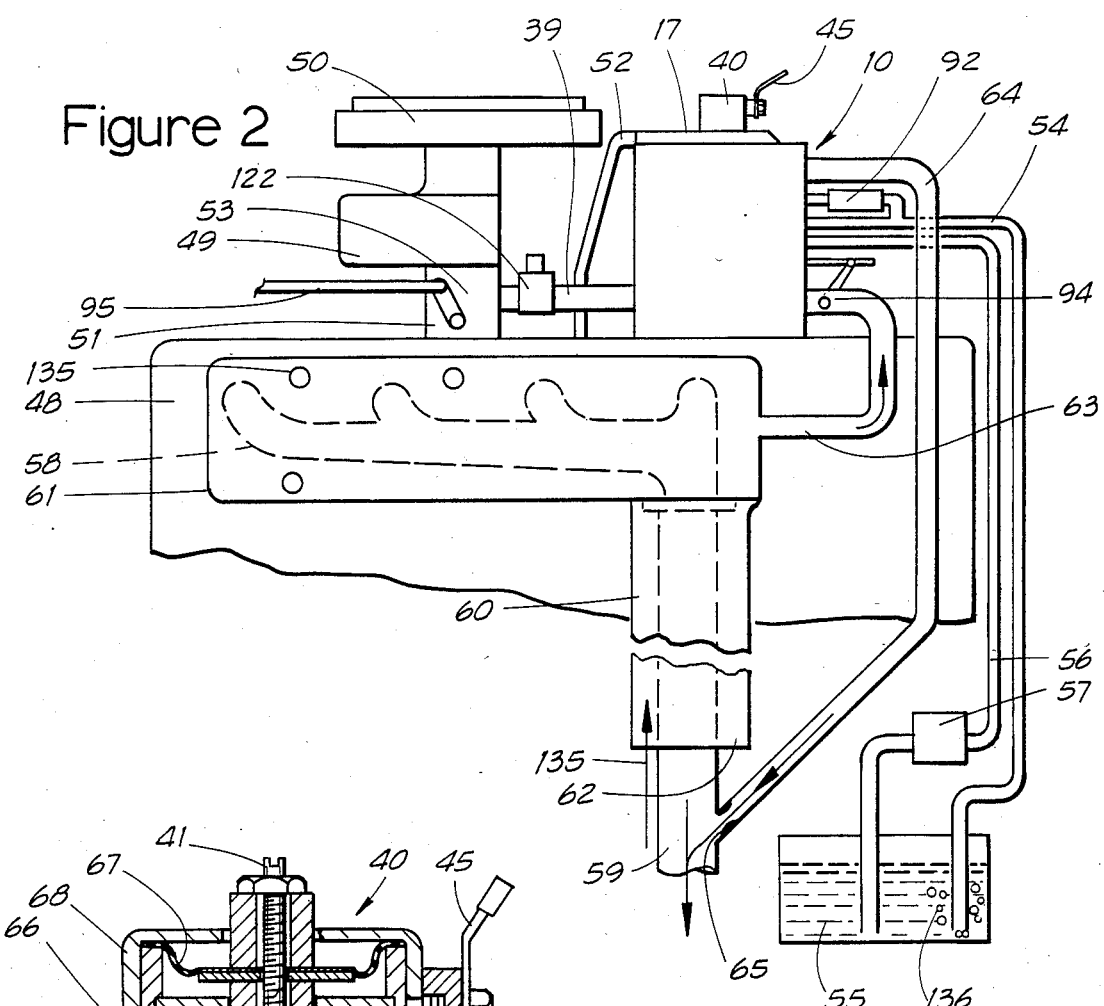
FIG. 2 is a diagramatic illustration of the fuel system mounted upon an internal combustion engine incorporating the generator of FIG. 1.

Now referring to FIG. 2 noted is a diagramatic illustration of an internal combustion engine 48 whereupon is mounted vapor generator 10, exhaust manifold 58 encased in jacket 61 and connected onto the manifold is exhaust pipe 59, which said pipe in turn is partially encased by air conduit sheath enclosure 60, wherein ambient air 135 is superheated, then conveyed by means of conduit 63 to butterfly air-flow control 94 and consequently into the heat exchanger chamber 18 of generator 10. Also noted associated is liquid fuel supply tank 55, from which fuel is drawn by either gravity or moderate pressure delivery pump, as shown by numeral 57, and then conveyed by means of conduit 56 to high pressure pump 30 within generator 10. Also associated with the fuel tank is the high pressure pump exhaust conduit 54 cooperating with pressure relief valve 92 exhaust conduit whereby their exhaust vapors are commonly coursed to tank 55 for condensation back to liquid fuel, as illustrated by bubbles 136. Vacuum conduit 52 is connected onto the engine intake manifold and generator closure cover 17. Generator secondary chamber 16 previously mentioned is connected to engine carburetting venturi system 53 by minimum length coupling 39, and solenoid on-off valve 122 may be in series, if so desired. A dual carburetor 49 is shown along with air cleaner 50 and throttle valve linkage 95.

Again referring to FIG. 1 noted is a combination solenoid and vacuum device 40 urging the secondary valve arm 149 in downward direction. This unit is better described in FIG. 3 of this specification.

Figure 3:
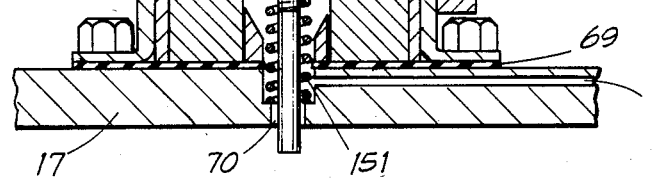
FIG. 3 is a cross-sectional view of a combination solenoid and vacuum device incorporated in generator of FIG. 1 to initiate and maintain a minimum flow of vapor fuel during engine operation.

Now referring to FIG. 3 the unit is similar to that of a conventional solenoid, having a metal shell 68, an electrical coil 66, electrical lead wire 45, armature shaft 41 and return spring 151. However the difference being in that this unit incorporates a vacuum system for also operating the armature shaft when the electrical solenoid is not energized. The vacuum system includes a flexible diaphragm 67 centrally fixed upon the armature shaft, and the periphery of which is marginally clamped between the unit cover and coil body. The armature having a concentric threaded member for adjusting overall length, and having minimum diametrical clearance with bore and counterbore 70 in generator cover plate 17.

Numeral 71 represents a channel in cover plate 17 for vacuum means to female adaptor 44 of cover plate 17 FIG. 1. Numeral 69 represents a gasket fluid sealing the vacuum with cover plate 17.

Figure 4:
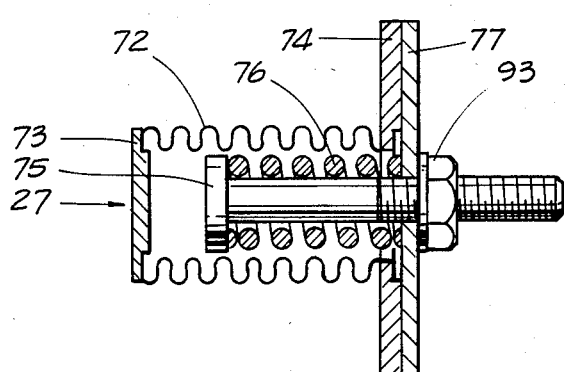
FIG. 4 is a cross-sectional view of a pressure responding device comprised of a bellows-spring assembly, function of which is to control superheated air flow through heat exchanger chambers in generator of FIG. 1.

Referring again to FIG. 1 noted is pressure activated combination bellows-spring assembly 27, better illustrated by FIG. 4 of this specification.

Referring now to FIG. 4 whereupon the bellows convolutes 72 are terminated upon their pressure receiving end by closure plate 73 and their opposite end being attached onto mounting plate 74. Inserted within the bellows assembly is a separate assembly comprised of a threaded bolt 75, compression spring 76, mounting plate 77 and threaded nut 93. Upon assembly, the spring and mounting plate are placed upon the bolt with the nut. The nut is adjusted, compressing the spring to a calculated loading, then inserted into the bellows assembly. The combined assembly of bellows and spring react from pressure within chamber 11 causing an extending motion of the bolt from the generator body, thus motivating the butterfly valve previously mentioned in this specification.

Figure 5:
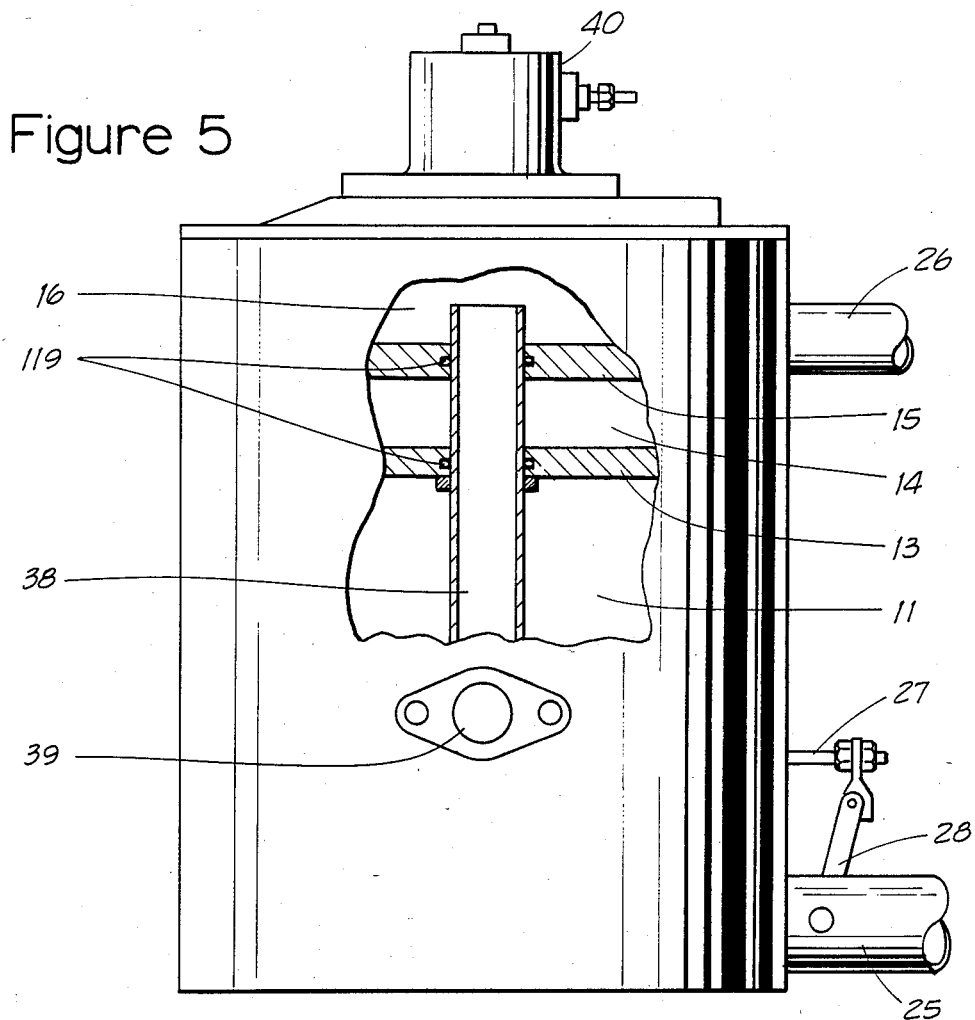
FIG. 5 is a partial cutaway view of the generator of FIG. 1 wherein is exposed a vapor transfer conduit tube with cooperating fluid seals.
Figure 6:
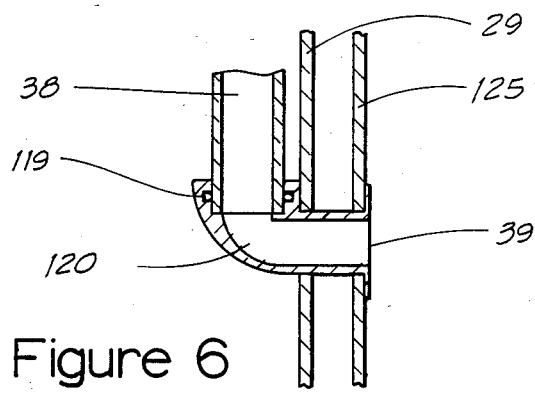
FIG. 6 illustrates a method of attaching vapor transfer tube of FIG. 5 onto walls of generator of FIG. 1.

Referring again to FIG. 1 noted in the background is vapor conduit tube 38 which is better illustrated by FIGS. 5 and 6 in drawings of this specification. This means is provided to better reduce the height for the vapor fluid outlet, from that of an upper location upon the vaporizer body, to that of a lower position more practical for attachment onto the carburetor system of the engine.

Referring now to FIG. 5 is a vapor conduit tube 38 passing from chamber 16, through plate 15, through chamber 14, through plate 13 into chamber 11, both plates having "O" ring fluid seals 119 with tube 38.

Referring now to FIG. 6 noted is tube 38 terminating in elbow 120, also being fluid sealed by an "O" ring 119 in elbow 120, and elbow permanent attachment upon generator walls 29 and 125.

Referring again to FIG. 1 noted within the compression chamber 11 is a liquid fuel dipensing pump 30 mounted upon wall 29. Attached upon the pump body, as part of its assembly, is a needle valve assembly 33, and fuel level control float 35.

A particular novelty of this pump system is, that motivating force to operate, is derived from pressure surrounding it within the compression chamber. The pump and function are better described in FIGS. 7 through 15 of drawings in this specification.

Referring now to FIG. 7 illustrated is an upright side view of pump 30 wherein a partial cutaway section, the course followed by the liquid fuel is outlined. Liquid fuel from supply tank enters the pump body at intake port 139, being fluid sealed within counterbore 79 by "O" ring 80, is then coursed through check-valve seat 81, past valve ball 82, being biased by spring 83 and consequently through channel 84 into piston compression bore 85. During the fuel discharge cycle, a fuel is forced from bore 85 into channel 86, coursing past ball and seat check-valve 87 being biased by spring 88 and into needle valve assembly 33, from which the fuel is dispensed into chamber 11 past valve needle 78 as noted by stream 140.

Referring now to FIG. 8 illustrated is a top view of FIG. 7 showing the pump body 30, cylinder closure member 113, upper piston extension 96, valve member extension 100, lateral toggle bar extensions 152 and 153 with rocker bearings 154 mounted rotatably upon extreme ends thereof, and upon the rocker bearings, are attached springs 110 under tension. Also of note is that lateral crossbar 152 is permanently attached onto the double toggle bar assembly 107, and lateral crossbar 153 is permanantly attached onto toggle bar 108.

Referring now to FIG. 9 which is a bottom view of FIG. 7. in which four internally threaded holes 89 are shown as means for attaching pump 30 onto generator wall 29, FIG. 1. Also shown are lower piston extension bore 91, valve member bore 90, liquid fuel entry 139 and pump exhaust port 137.

Referring now to FIG. 10 and wherein a diagramatic view, of generator circuitry is illustrated. Shown is a liquid fuel conduit 56 connected in series with a moderate pressure pump and filter system flowing said fuel from tank 55 to pump 30 within the generator compression chamber 11, exhaust from pressure relief valve 92 being routed into same conduit 54 as exhaust from pump 30 and consequently into tank 55 for condensing to liquid state. Also of note is that hot air 24 enters generator by means of connecting tube 25 and is dicharged from said generator by means of connecting tube 26 and that pressure control member 27 is reciprocal and interconnected with 90 degree rotatable butterfly valve 94.

Referring now to FIGS. 11 and 13 whereby both views are upright and sectional taken of pump 30 along line A—A of FIG. 7. The difference being that FIG. 11 is a left-hand view showing positions of piston and valve at initiation of fuel intake cycle, and FIG. 13 is a right-hand view showing positions of piston and valve at initiaton of fuel dispensing cycle. Illustrated is the pump body 30, compound piston represented by a force section 104, a fuel discharging section 138, a lower extension 97 and an upper extension 96, the strucure of which is generally referred to as being double-ended and multi-diametered piston; the force section having greater work face surface area than that of the discharge work face surface area, all sections of which being reciprocal within corresponding bores; also noted parallel to, but somewhat offset from the piston is valve member 100, being of cylindrical configuration with fluid passage 141 between seal land 102 and seal land 103, and fluid passage 142 between seal land 102 and seal land 114, the valve being reciprocal within its corresponding bore. In both illustrations it is noted that the upper piston extension 96 is interconnected with toggle arm 107 by interlocking groove 111 and cross-pin 112, and that valve member 100 is interconnected with toggle arm 108 by interlocking groove 117 and toggle arm extension 116, both toggle arms having a common center upon pivot shaft 109. The opposing toggle arms 107 and 108 are, upon their extreme ends, tensioned together by double springs 110, as shown by FIGS. 12 and 14. FIG. 12 being corresponding example from FIG. 11, and FIG. 14 being corresponding example from FIG. 13.

Referring again to FIGS. 11 and 13 it becomes obvious that due to the interlocking systems between piston, toggle bars and valve member, that for the pump to function, both piston and valve are dependent upon each other, whereupon reciprocation of the piston, which receives the motivating force, the piston extension 96 being interconnected with companion toggle bar 107 forces said toggle bar to move in unison in same direction, causing said bar to cross over midpoint continuous alignment with opposing toggle bar 108. After cross over of midpoint alignment of toggle bar ends and common center 109, springs 110 having tension force upon ends of toggle bars 107 and 108 cause toggle bar 108 to move rapidly from the rest position, either adjustable screw 129 or 143, onto the opposite, whereupon toggle arm 108 motivates valve member 100 to reciprocate in alternating fashion, directing force from pressure chamber 11 onto either piston face 155 or 156, depending upon which is exposed to receive said force.

In this invention wherein the high pressure liquid fuel dipensing pump 30 is enveloped by compression chamber pressure influence, need is to equalize said force upon certain components exposed to said influence, and those having need are the piston end extensions and ends of the valve. To equalize pressure influence upon the piston ends, both extensions identified respectively by numerals 96 and 97 are of same diameter and exposed surface area, end 97 having communication with chamber 11 by means of channel 123 and end 96 being exposed to said chamber outside piston bore closure 113.

OPERATION

Upon installation the compression chamber is charged with an approximate pint of fuel and all air is replaced with an inert gas removing all oxygen from the system.

Upon starting the internal combustion engine equipped with the herein described invention, a cooperative system of dual carburetion such as for gasoline, propane or similar system is required. The engine is first started on the auxiliary system and operated for approximately three to five minutes, whereupon sufficient vapor pressure has been generated for switch over to the vapor system. Later in this specification will be described a separate heating system whereby no heat-up by auxiliary carburetion is necessary.

Upon the engine being started by the auxiliary carburetion system, hot flame and exhaust gases flow through exhaust manifold 58 and exhaust pipe 59 and muffler system (not shown) into the atmosphere. Ambient air 135 is drawn into sleeve 60 surrounding the exhaust pipe 59 and into manifold enclosure 61, whereupon the incoming air is heated to super hot temperature and is coursed into the heat exchange chambers 18 and 21, and out of generator through outlet 26 and coursed by means of conduit 64 to a venturi system 65 adjoined onto exhaust pipe 59. Said venturi system providing the motivating force for moving the ambient and superheated air.

Hot air upon entering chamber 18 is further coursed through passages 20 into jacket chamber 21, wherefrom both chambers, super heat is transferred into the liquid fuel within chamber 11. Consequently, due to continuous flow of heated air and transfer of heat, the fuel reaches the temperature of its initial boiling point and commences to boil, emitting vapor.

Since the fuel is confined within an enclosed chamber, vapor pressure is generated. With constant flow of hot air transfering heat into the fuel, temperature and vapor pressure increase to that of that particular fuel's distillation end point, whereupon pressure within the compression chamber actuates pressure control member 27, causing threaded member 75 to protrude in an outward manner. Since said member 75 is interconnected with butterfly assembly 94 by linkage means 28, said butterfly valve is then partially closed, resulting in throttling rate of superheated air flow entering chambers 18 and 21, thereby controlling vapor pressure and temperature within compression chamber 11. Vaporized fuel is conveyed from compression chamber 11 to the carburetor venturi 53, FIG. 2 by passage means through a series of pressure reducing chambers 14 and 16, conduit tube 38, elbow 120 and vapor conduit 39, which is connected to engine induction system prior to the carburetor throttle valve.

Referring to primary pressure reduction chamber 14, of FIG. 1 wherein pressure is reduced from that of compression chamber 11 to between 5 and 8 pounds per square inch maximum, this reduction is achieved through action of vapor pressure against the primary diaphragm 150, which actuates the primary lever mechanism 157 and overcomes calibrated spring 42, thus closing valve 36-37. Vapor fuel is now available for delivery to the carburetor according to engine demand over its operating range. Starting and idle fuel is supplied through valve 43, being initiated by solenoid 40, connected to starter switch, and armature shaft 41 pressuring secondary arm 149, slightly cracking said valve. This is a positive idle system whereby the slightly opened valve condition is continued after solenoid is discharged, and is then operating by means of the vacuum holding system incorporated within the solenoid body, specifically for that purpose. As the engine speed increases above idle, a vacuum is created in the carburetor venturi and is transmitted through conduit 39 into the secondary chamber 16. Atmospheric pressure exerted through vent hole 121 in cover 17, forces secondary diaphragm 148 and secondary lever 149 down and compresses flat spring 144. Any increase in venturi vacuum will force the valve 43 to increase in opening. The fuel will continue to flow in proportion to air velocity through the carburetor venturi, insuring an ideal mixture at all engine speeds.

A safety feature is in the automatic vacuum shut-off means which locks off fuel completely when the engine stops rotating. The instant the engine begins to turn, the vacuum-lock diaphragm 147 is drawn down and then the secondary regulator becomes a slightly positive unit. This diaphragm remains down, out of the way, while the engine is running. Although a vacuum gauge may show a zero reading during heavy pulling, the air velocity past the manifold vacuum connection is still great enough to hold this relatively large vacuum diaphragm so that it does not interfere with normal operation. When the engine is stopped, the release of manifold vacuum allows the vacuum-lock spring 158 to push the diaphragm bumper 159 against the secondary regulator lever 149 and exert an especially tight closing force to insure a 100% shutoff of valve 43.

Figure 16:
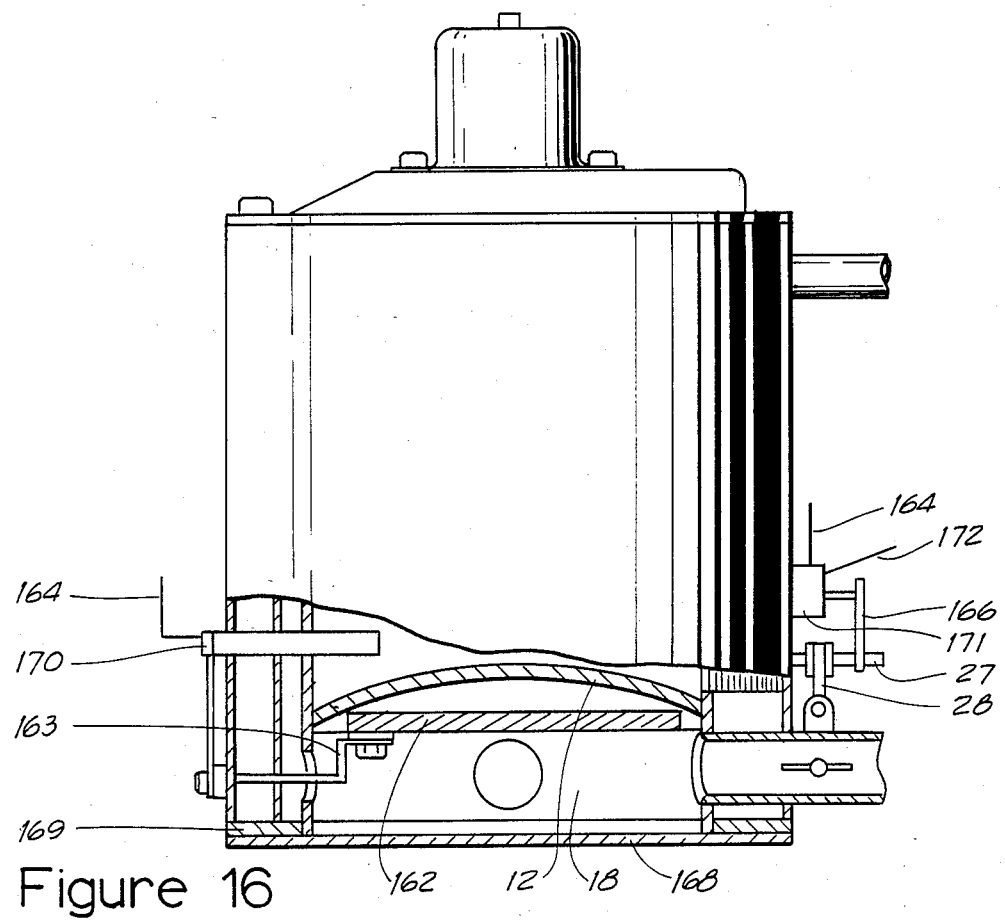
FIG. 16 illustrated in a partial sectional view of the generator of FIG. 1 wherein a supplementary heating method by electric resistance means is employed, a removable access plate and two electric circuit control switches connected in series, being operated by thermal and mechanical means.

Referring now to FIG. 16 wherein a partial cutaway view of the generator 10 is shown with an alternate method of applying and maintaining heat to liquid fuel within compression chamber 11, wherein solid plate 19, FIG. 1 is exchanged for ring member 169 providing access into chamber 18. A plate 168 is now provided for closure. Within chamber 18, an electric resistant heater or heaters 162 are intimately fixed onto boiler compression chamber bottom plate 12. Lead wires 163 from heater are connected to thermally operated electric switch 170 and then in series connect, attached to mechanically operated electric switch 171, said switch 171 having interconnected means 166 with pressure actuated member 27, thus providing dual protection against overheating or overpressurizing the compression chamber 11. Electric energy for resistance heater being supplied to through lead wires 172 from a suitable voltage source. This system is for standby or initial heat-up service only especially for installations where engines are stationary industrial or farm irrigation.

Figure 17:
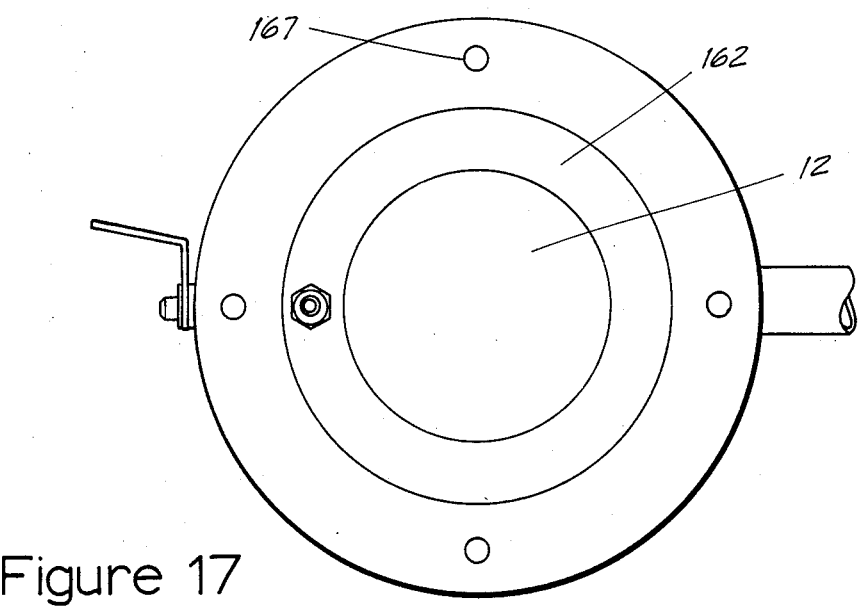
FIG. 17 is a bottom view of FIG. 16.

Now referring to FIG. 17 view showing bottom of generator 10 with cover plate 168 removed, showing screw attachment holes 167 provided for securing plate 168 over chamber 18, and the electric resistance heater element 162 installed.

Although but one embodiment of the present invention has been illustrated and described, it will be apparent to those skilled in the art that various changes and modifications may be made therein without departing from the spirit of invention or from the scope of the applied claims, and having thus described my invention what I claim is:

1. In a internal combustion engine including a throttle valve, a mechanical speed control means, and a linkage connecting said mechanical speed control means to said throttle valve, wherein the improvement comprises a generator for producing fuel vapor under relatively high pressure and supplying said fuel vapor to said engine through said throttle valve, the generator comprising a closed pressure boiler compression chamber means; first chamber means positioned adjacent to the boiler compression chamber, second chamber means surrounding the boiler compression chamber, mechanical pumping means positioned within said compression chamber; mechanical pressure reducing means within the generator which reduces the pressure of the fuel vapor produced from said boiler compression chamber to a suitable pressure acceptable for vacuum demand from the engine induction system; air heating means passing ambient air in heat exchange relationship with a heated engine component and air passage means through which said heated air is supplied to the first chamber means from which the heated air flows to the second chamber means; compression chamber pressure controlling means; air motivating means circulating said heated air flow; and electric solenoid means positioned downstream of the pressure reducing means in the fuel vapor flow path, said solenoid means combined with vacuum means and vacuum diaphragm means to initiate and maintain vapor flow in relation to engine demand.

2. The invention of claim 1 wherein the boiler compression chamber means is capable of producing and maintaining a temperature of 500 degrees F. and a vapor pressure of 350 pounds per square inch.

3. The invention of claim 2 wherein the boiler compression chamber means is in heat exchanging relationship with the chambers attached to the periphery of said boiler compression chamber.

4. The invention of claim 1 wherein the thermal insulation means encircles the periphery of said generator.

5. The invention of claim 3 wherein thermal insulation means encircles the periphery of said generator.

6. The invention of claim 1 wherein the mechanical pumping means positioned within the compression chamber means is a liquid fuel intake and dispensing pump means; motivating means for said pump being derived from pressure within the boiler compression chamber.

7. The invention of claim 6 wherein the pump means is comprised of a body means containing reciprocal compound piston means; interconnecting means between said piston means and cooperating valve means, and said cooperating valve means being activated by spring tensioned toggle bar means.

8. The invention of claim 1 having actuating means in communication with the boiler compression chamber means whereby the flow of heated air to said first and second chamber means is regulated by the pressure within said boiler compression chamber means.

9. The invention of claim 1 wherein first pressure regulating means reduces the vapor pressure exiting the boiler compression chamber means to between 5 and 8 pounds per square inch; and wherein second pressure regulating means further reduces the vapor pressure to correspond to engine demand.

10. The invention of claim 1 wherein fuel vapor flow to the engine is controlled by a dual system consisting of an electric solenoid and a vacuum diaphragm means housed in a single structure.

11. The invention of claim 1 wherein ambient temperature atmospheric air is heated by being passed through heating means consisting of sleeves surrounding the engine exhaust pipe and exhaust manifold means, and thence is passed through heat exchange means within the generator and finally is introduced into the exhaust pipe gas flow stream.

12. The invention of claim 1 wherein excess fuel from the compression chamber pump and excess vapor from the pressure relief valve are salvaged by recycling to the fuel source.

13. The invention of claim 1 wherein initial vaporization of the liquid fuel is accomplished by electric resistance heating means.

* * * * *